(12) United States Patent
Betcher et al.

(10) Patent No.: US 7,406,957 B2
(45) Date of Patent: Aug. 5, 2008

(54) AIR HEATER WITH ONE-PIECE HOUSING

(75) Inventors: Scott A. Betcher, Burnsville, MN (US); Jan P. Thimmesch, Eden Prairie, MN (US)

(73) Assignee: Phillips & Temro Industries Inc., Eden Prairie, MN (US)

( * ) Notice: Subject to any disclaimer, the term of this patent is extended or adjusted under 35 U.S.C. 154(b) by 183 days.

(21) Appl. No.: 11/357,795

(22) Filed: Feb. 17, 2006

(65) Prior Publication Data

US 2007/0193562 A1    Aug. 23, 2007

(51) Int. Cl.
*F02M 31/12* (2006.01)

(52) U.S. Cl. ....................... 123/556; 123/549

(58) Field of Classification Search ................ 219/206, 219/536, 537, 523, 532, 520; 123/556, 549; 392/250, 371, 379, 485, 279
See application file for complete search history.

(56) References Cited

U.S. PATENT DOCUMENTS

| | | | |
|---|---|---|---|
| 5,334,818 A | 8/1994 | Edwards et al. | |
| 5,743,242 A | 4/1998 | Thimmesch | |
| 5,887,575 A | 3/1999 | Thimmesch et al. | |
| 5,988,146 A | 11/1999 | Anderson et al. | |
| 5,992,399 A | 11/1999 | Anderson et al. | |
| 6,031,204 A | 2/2000 | Prust et al. | |
| 6,040,557 A | 3/2000 | Prust et al. | |
| 6,073,615 A | 6/2000 | Anderson et al. | |
| 6,119,665 A | 9/2000 | Anderson et al. | |
| 6,152,117 A | 11/2000 | Prust | |
| 6,242,712 B1 | 6/2001 | Prust | |
| 6,325,053 B1 * | 12/2001 | Zappador et al. ............ 123/549 |
| 6,651,632 B2 | 11/2003 | Thimmesch | |
| 6,789,530 B2 * | 9/2004 | Navalon Carretero et al. .... 123/556 |
| 2006/0153546 A1 | 7/2006 | Gschwind et al. | |

FOREIGN PATENT DOCUMENTS

| | | |
|---|---|---|
| DE | 195 15 533 | 11/1996 |
| DE | 100 26 339 | 12/2001 |
| DE | 203 12 776 | 10/2003 |
| EP | 0 821 220 | 1/1998 |
| EP | 1 679 435 | 7/2005 |
| WO | WO0034643 | 6/2000 |

* cited by examiner

*Primary Examiner*—M. McMahon
(74) *Attorney, Agent, or Firm*—Harness, Dickey & Pierce, P.L.C.

(57) ABSTRACT

A heating device for use in an internal combustion engine having an intake defining a passage is disclosed. The intake includes an opening in communication with the passage. The heating device includes a one-piece housing having a mounting flange portion and a first leg portion positioned substantially parallel to and spaced apart from a second leg portion. The mounting flange is adapted to mount to the intake and cover the opening. The heating element is coupled to the one-piece housing and positioned between the first and second leg portions. The heating element is positioned in a heat transfer relation with the passage to thereby heat air flowing through the passage.

28 Claims, 6 Drawing Sheets

AIR HEATER WITH ONE-PIECE HOUSING

BACKGROUND

The invention generally relates to an apparatus for heating the air/fuel mixture entering the cylinders of an internal combustion engine. More particularly, the invention relates to an electric heater having a one-piece housing adapted for mounting to the air intake system of an engine.

The air/fuel mixture entering the cylinders of an internal combustion engine is commonly heated to increase fuel economy and responsiveness to starting as well as to decrease pollutant discharge. One type of intake heating device generally includes a housing or frame disposed between a fuel delivery device and an air intake manifold. Another type of intake heating device is mounted within an open cavity of an intake manifold. After this second type of heating device is mounted on the intake, the heater and intake subassembly is subsequently mounted to an engine. In the aforementioned devices, current is passed through a heating coil or grid to increase the temperature of the surrounding air as it passes into a combustion chamber of the engine.

While the aforementioned heaters generally address cold starting and fuel economy issues, other concerns remain. For example, access to the prior art heaters is obtained only after the intake manifold is removed from the engine. Retro-fitting an existing vehicle not originally equipped with a heater is similarly difficult. In addition, prior art heaters have been specifically constructed to package within a given geometry and function only with a certain power system. As a result, many heater components were proliferated in order to meet varying customer needs. Furthermore, many prior heater designs exhibit unsatisfactory vibration resistance. These heaters may not continue to properly function after being fitting to a vehicle and subjected to repeated impact loading due to road inputs as the vehicle is used.

Accordingly, in view of the above concerns as well as the manufacturer's ever present desire to reduce manufacturing costs and complexity, a need exists for a robust air heater having a one-piece housing that may be installed within a vehicle intake air system without removing the intake manifold.

SUMMARY

The present disclosure relates to a heating device for use in an internal combustion engine having an intake defining a passage. The intake includes an opening in communication with the passage. The heating device includes a one-piece housing having a mounting flange portion and a first leg portion positioned substantially parallel to and spaced apart from a second leg portion. The mounting flange is adapted to mount to the intake and cover the opening. The heating element is coupled to the one-piece housing and positioned between the first and second leg portions. The heating element is positioned in a heat transfer relation with the passage to thereby heat air flowing through the passage.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
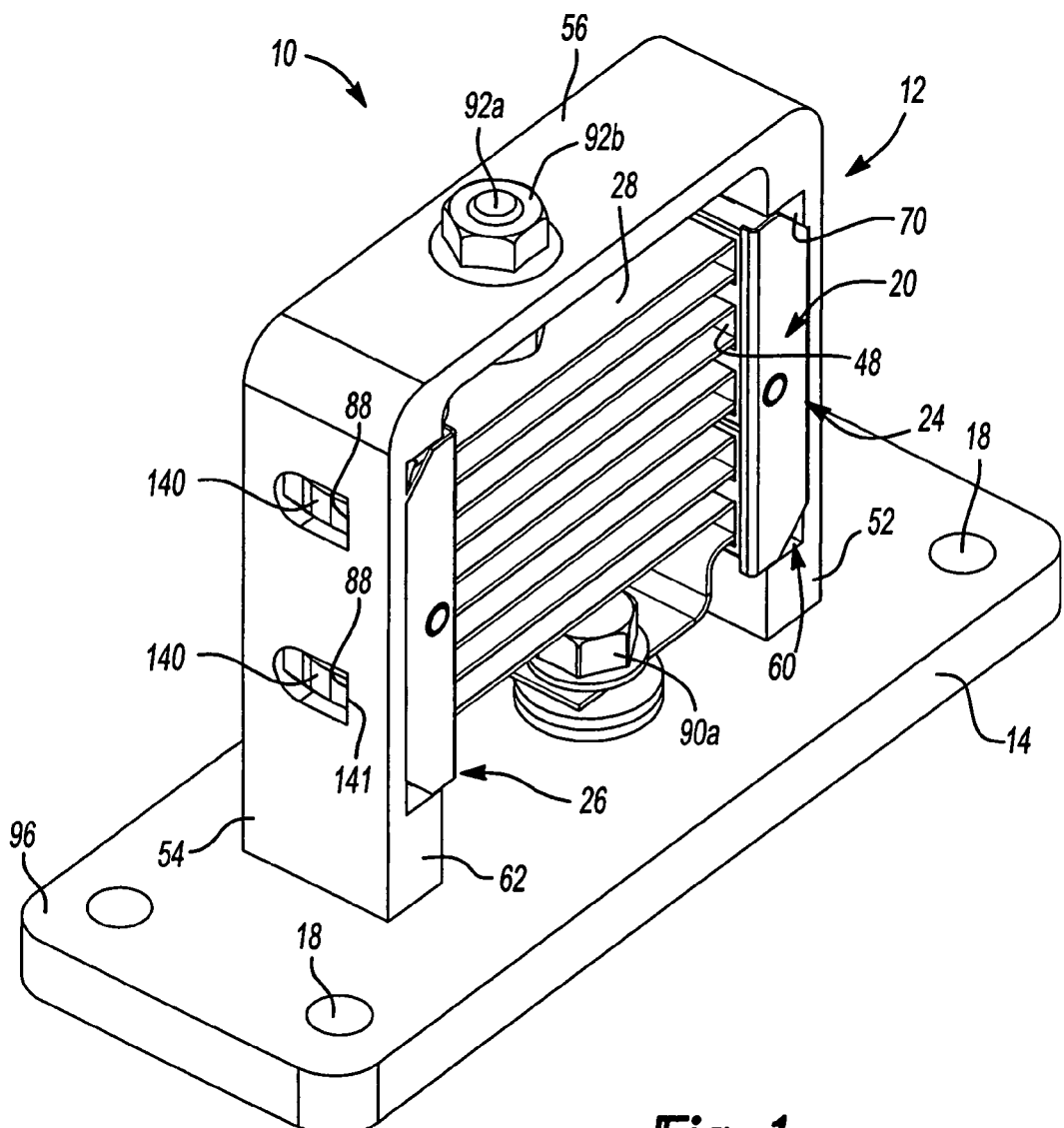
FIG. 1 is a perspective view of an air heater having a one-piece housing as provided by the present disclosure.

The disclosure relates to an air heating device for use in an internal combustion engine. More particularly, the heating device includes a one-piece housing that retains one or more heating elements and heating element holders in predetermined positions relative to the housing.

In addition to the above advantages, the present invention provides an air heater that is integratable into the air intake system of a diesel engine and, more particularly, within a passageway of an air intake tube. This unique configuration of the air heater, including the heater housing, provides enhanced heater durability. The design also provides improved mounting flexibility over traditional bolt-on heater designs.

The air heater of the present invention will now be described in greater detail with reference to FIGS. 1-3. An air heater 10 includes a one-piece housing 12 having an integral mounting flange 14. Mounting flange 14 is connectable to an air intake tube 16 of the vehicle engine such as through apertures 18 formed therein. As will be described in detail below, mounting flange 14 further serves to seal the engine intake passage from the environment surrounding the engine compartment.

Figure 2:
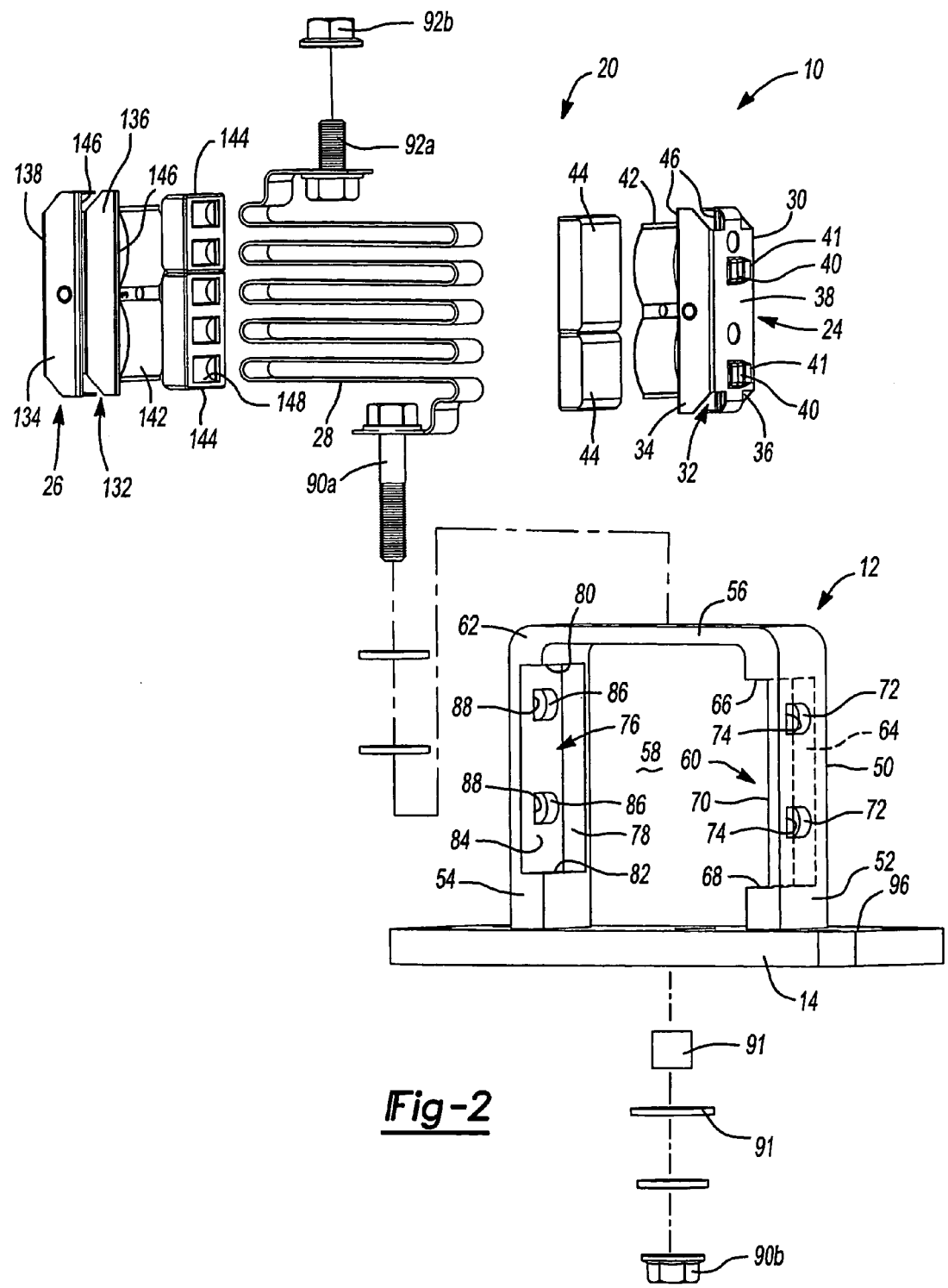
FIG. 2 is an exploded perspective view of the heater depicted in FIG. 1.
Figure 3:
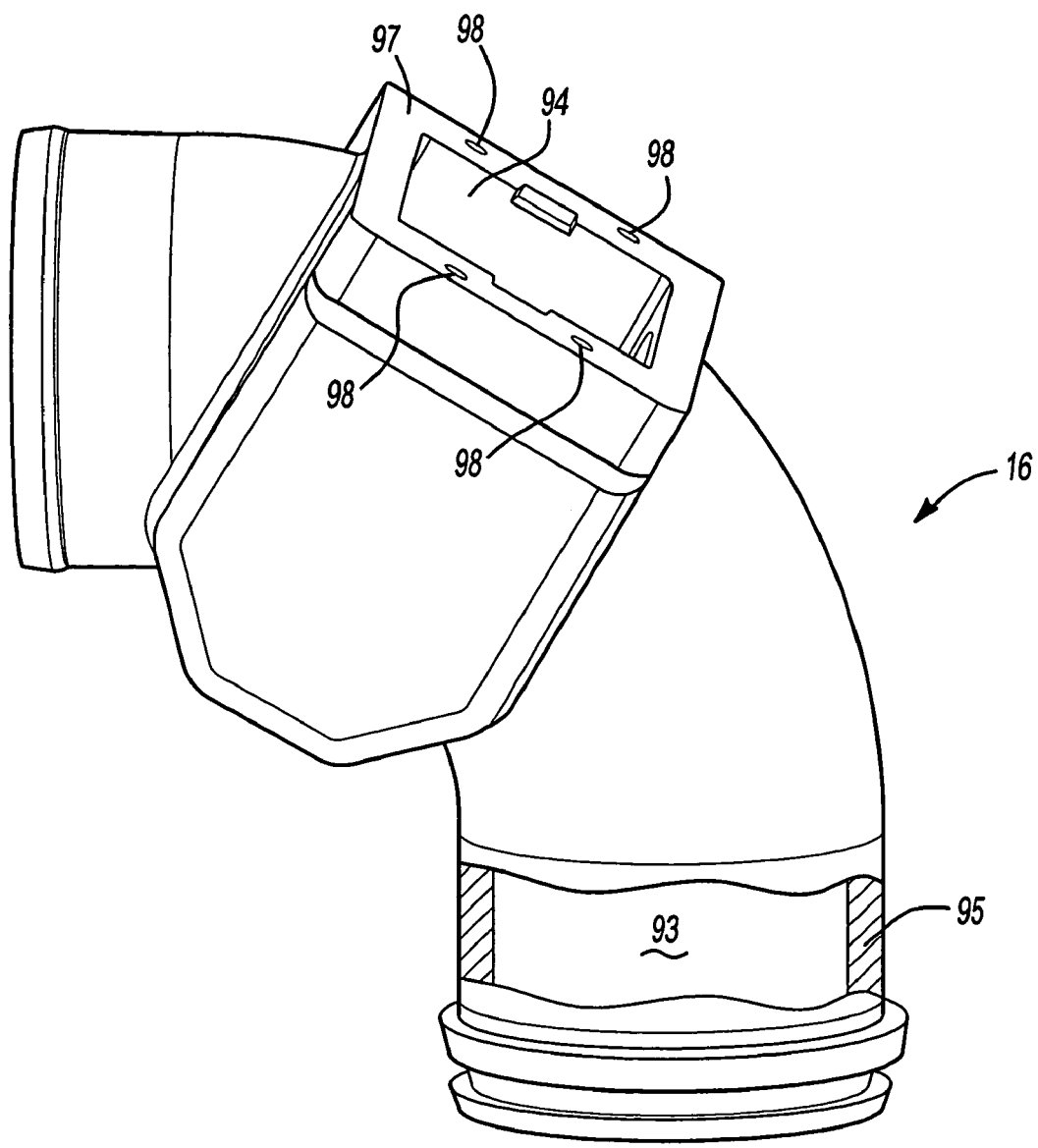
FIG. 3 is a fragmentary perspective view of an exemplary intake tube formed in an internal combustion engine.

As best illustrated in FIGS. 1 and 2, heater 10 includes a heater module 20 coupled to one-piece housing 12. Heater module 20 includes a first holder 24, a second holder 26, and a serpentine heating element 28. First holder 24 includes a housing 30 preferably shaped from a stainless steel sheet. Housing 30 defines a "C" shaped channel 32 bounded on three sides by opposed side walls 34 and 36 and an end wall 38. Housing 30 includes tabs 40 protruding from end wall 38. Each tab 40 includes an end face 41.

Wave springs 42, also preferably formed of stainless steel, are disposable within channel 32 to engage end wall 38. Thermal and electric insulators 44 are disposable within channel 32 to engage and capture springs 42 between end wall 38 and insulators 44. Those skilled in the art will appreciate that wave springs 42 urge insulators 44 away from end wall 38 and into engagement with stops 46 which extend inwardly into channel 32 from side walls 34 and 36. Insulators 44 include cavities 48 to accommodate and position heating element 28 therewithin. It is contemplated that insulators 44 may be formed of a ceramic material known in the art to provide the desired thermal and electrical insulating properties.

Second holder 26 is configured substantially similarly to first holder 24. Accordingly, like elements are enumerated to include similar reference numerals increased by 100. Those skilled in the art will appreciate that the configuration and interrelation of channel 132, side walls 134 and 136, end wall 138, tabs 140, end faces 141, wave springs 142, insulators 144, stops 146 and cavities 148 are substantially the same as the corresponding components described in relation to first holder 24.

Housing 12 includes a "U" shaped frame portion 50 integrally formed with mounting flange 14. Frame portion 50 includes a first leg 52 and a second leg 54 having ends interconnected by a third leg 56. The opposite ends of first leg 52 and second leg 54 are interconnected by flange 14. Each of first leg 52, second leg 54 and third leg 56 are shaped as substantially right rectangular parallelepipeds integrally formed with one another and mounting flange 14 to define a window 58.

First leg 52 includes a generally "C" shaped first recess 60 inwardly extending from a first face 62. First recess 60 is defined by a seat 64, a first wall 66, a second wall 68 and a third wall 70 interconnecting first wall 66 and second wall 68. Third wall 70 includes a pair of apertures 72 extending therethrough. A portion of each aperture 72 is defined by a retaining wall 74.

Second leg 54 includes a second recess 76 shaped substantially similarly to first recess 60. Second recess 76 also inwardly extends from first face 62. Second recess 76 includes a seat 78, a first wall 80, a second wall 82 and a third wall 84 interconnecting first wall 80 and second wall 82. Third wall 84 includes a pair of apertures 86 extending through second leg 54. Each aperture 86 includes a retaining wall 88.

Housing 12 is preferably constructed from materials such as aluminum A380 and ADC10 that may be die cast to form one-piece housing 12. In one embodiment, none of the exterior surfaces of housing 12 require machining. Specifically, the walls defining first recess 60 as well as the walls defining second recess 76 remain in a "net-shaped" or "as-cast" condition throughout heater assembly and use.

Alternatively, housing 12 may be constructed using a powdered metal sintering process such that first leg 52, second leg 54, third leg 56 and mounting flange are integrally formed with one another to define one-piece housing 12.

To assemble air heater 10, heater module 20 is first sub-assembled and positioned relative to housing 12 to align heater module 20 with window 58. In the free state, end wall 38 of first holder 24 is spaced apart from end wall 138 of second holder 26 a distance greater than the separation between third wall 70 of first recess 60 and third wall 84 of second recess 76. Accordingly, to position heater module 20 within window 58, a compressive force is applied to first holder 24 and second holder 26 to compress wave springs 42 and wave springs 142. During application of the compressive force, first holder 24 is axially positioned within first recess 60 while second holder 26 is axially translated into position within second recess 76.

Heater module 20 is translated within window 58 until side wall 36 of first holder 24 contacts seat 64 and side wall 136 of second holder 26 contacts seat 78. During the assembly process, tabs 40 engage third wall 70. Similarly, tabs 140 engage third wall 84. Once end faces 41 of tabs 40 clear retaining walls 74, tabs 40 enter apertures 72. End faces 141 of tabs 140 are also translated to clear retaining walls 88 to allow tabs 140 to snap into apertures 86. At this time, end walls 38, 138 are biasedly engaged with third walls 70, 84, respectively.

Once heater module 20 is coupled to housing 12 as described, movement of heater module 20 relative to housing 12 is resisted in a first direction by seats 64 and 78. Relative movement between heater module 20 and housing 12 in an opposite direction is restricted by the engagement of end faces 41 with retaining walls 74 as well as end faces 141 with retaining walls 88. Wave springs 42 and 142 provide a biasing force to ensure that tabs 40 and 140 remain positioned within apertures 72 and 86.

Air heater 10 includes a first terminal having a bolt 90a and a nut 90b and a second terminal having a bolt 92a and nut 92b. First terminal 90a is electrically insulated from housing 12 with insulators 91 while second terminal 92a is electrically coupled thereto. An electrical path is formed by connecting one lead of a power source to first terminal 90a while a second power source lead is coupled to ground which includes housing 12. In this manner, a series electrical path exists between first terminal 90a and second terminal 92a to selectively energize heating element 28.

Once assembled, air heater 10 is coupled to air intake tube 16 (FIG. 3) having a passageway 93 in communication with a combustion chamber of an internal combustion engine. An opening 94 extends through a sidewall 95 of intake tube 16 to allow air heater 10 to be placed in communication with the air passing through intake tube 16 without disassembling the air intake system. Specifically, frame portion 50 and heating element 28 are passed through opening 94 to position heating element 28 within passageway 93. A substantially planar surface 96 of mounting flange 14 sealingly engages an outer surface 97 of intake tube 16. Fasteners (not shown) extend through apertures 18 formed in mounting flange 14 and threadingly engage apertures 98 formed in intake tube 16 to mount air heater 10 to intake tube 16. Once air heater 10 has been positioned and mounted as described, air passing through passageway 93 is not allowed to pass through opening 94 but is forced to travel across heating element 28.

Figure 4:
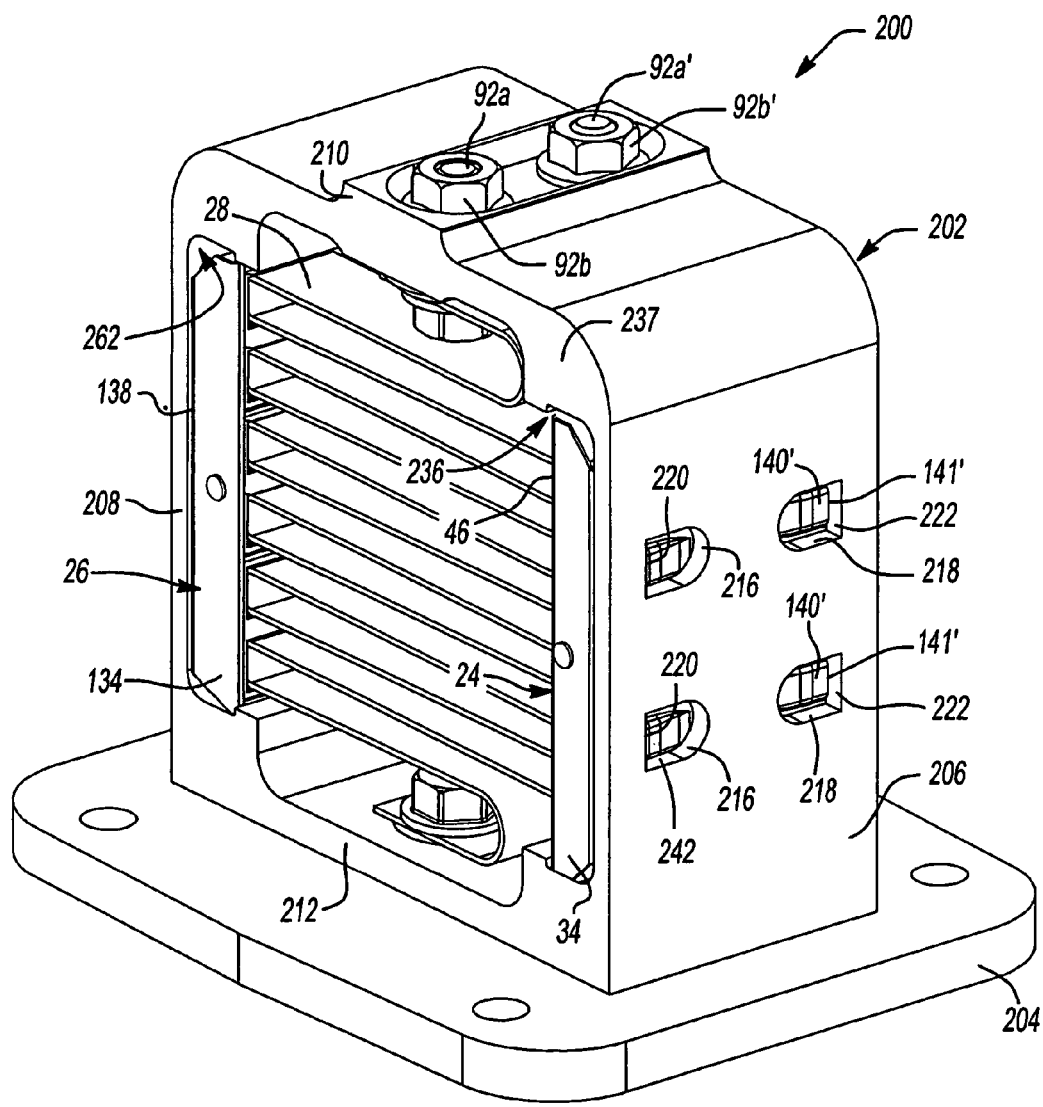
FIG. 4 is a perspective view of an alternate embodiment air heater having a one-piece housing.
Figure 5:
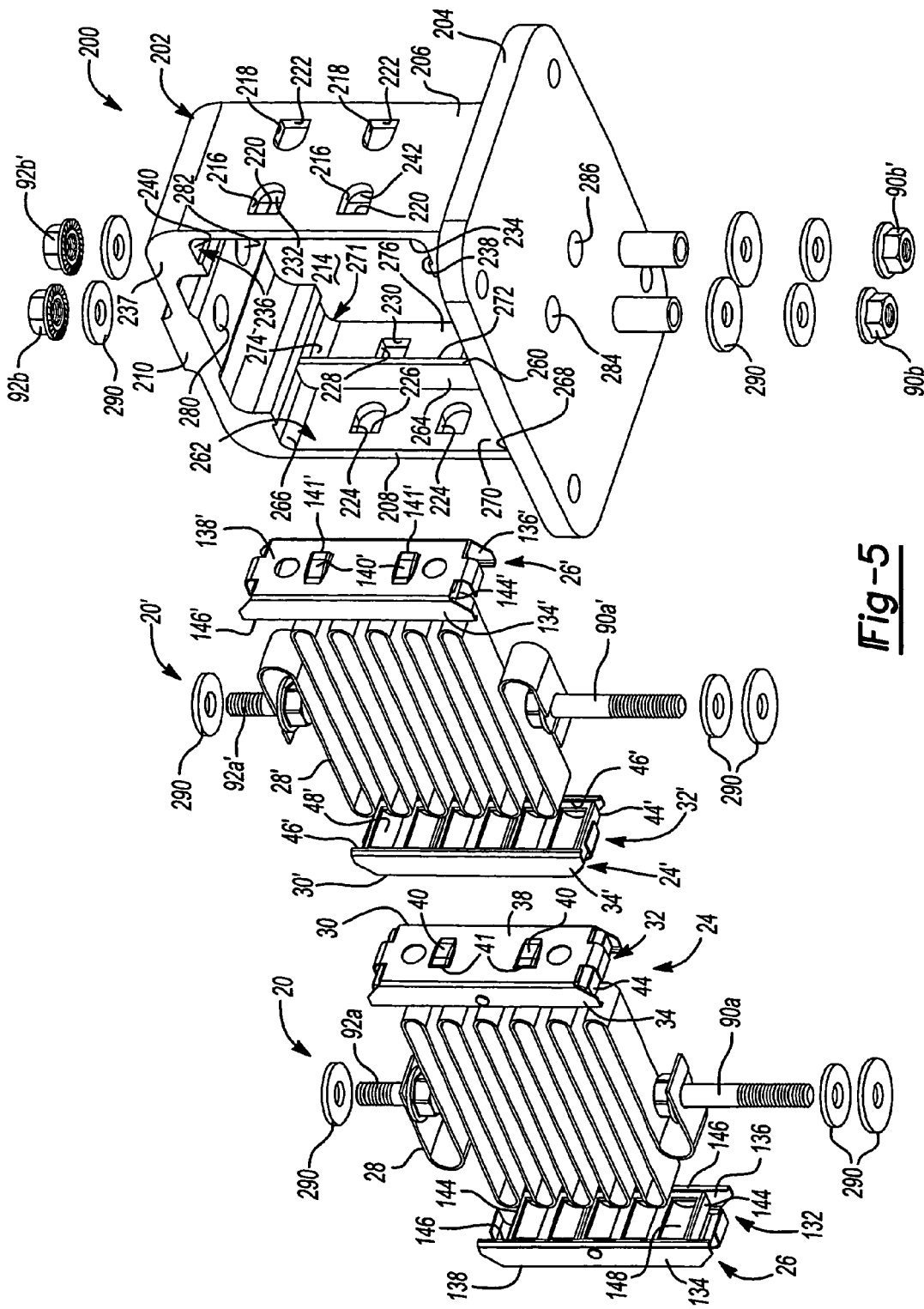
FIG. 5 is an exploded perspective view of the heater depicted in FIG. 4.
Figure 6:
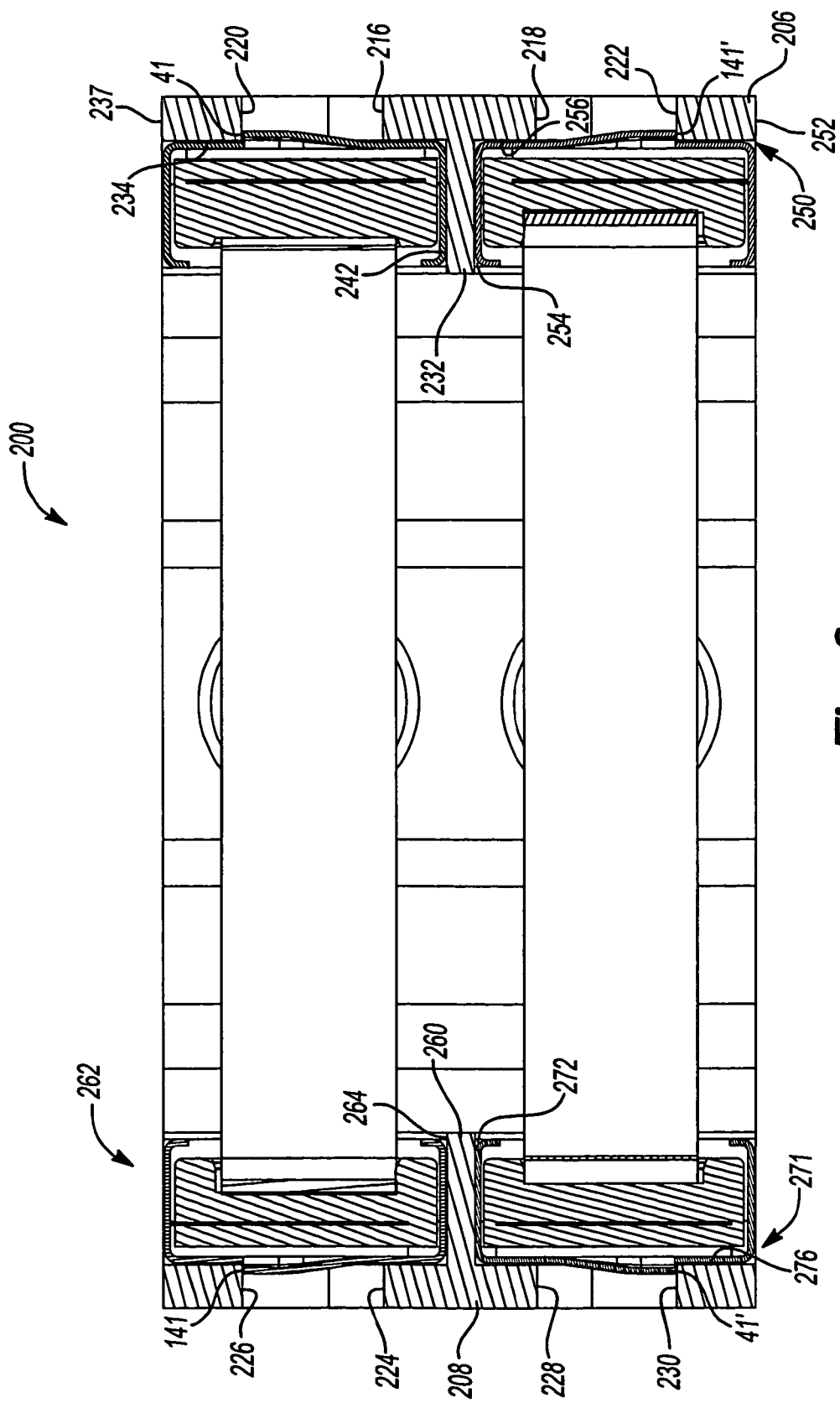
FIG. 6 is a cross-sectional view of the alternate embodiment heater shown in FIG. 4.

FIGS. 4-6 depict an alternate embodiment air heater 200 including first heater module 20 and a second heater module substantially similar to first heater module 20 identified as heater module 20' coupled to a one-piece housing 202. Because second heater module 20' is substantially similar to first heater module 20, like elements will retain their previously introduced reference numerals including a "prime" designation at the suffix of the reference numeral. To facilitate installation of first heater module 20 and second heater module 20' within one-piece housing 202, second heater module 20' is rotated 180° relative to first heater module 20.

One-piece housing 202 includes a flange 204, a first leg 206, a second leg 208, a third leg 210 and a boss 212. Each of elements 204 through 212 are integrally formed with one another to define one-piece housing 202. First leg 206, third leg 210, second leg 208, boss 212 and flange 204 form a frame circumscribing a window 214. First leg 206 includes a first set of apertures 216 and a second set of apertures 218 extending therethrough. Each aperture 216 is substantially "D" shaped having a retaining wall 220. Similarly, each aperture 218 is "D" shaped having a retaining wall 222. Second leg 208 includes a first set of apertures 224 each having a retaining wall 226. A second set of apertures 228 each having a retaining wall 230 also extend through second leg 208. A first rib 232 extends along the length of first leg 206 and radially inwardly protrudes from a wall 234. A first recess 236 inwardly extends from a face 237 extending along one edge of first leg 206, third leg 210, second leg 208 and boss 212. First recess 236 is defined by a first wall 238, a second wall 240, wall 234 and a seat 242 as provided by one surface of rib 232.

A second recess 250 (FIG. 6) is formed in first leg 206 and inwardly extends from a surface 252. Second recess 250 is partially defined by a seat 254, another surface of rib 232, as well as a wall 256 through which apertures 218 extend.

Another rib 260 radially inwardly extends from second leg 208. A third recess 262 is defined by a seat 264, a first wall 266, a second wall 268 and a third wall 270 which interconnects first wall 266 and second wall 268. Third recess 262 inwardly extends from face 237.

A fourth recess 271 is formed in second leg 208 and inwardly extends from surface 252. Fourth recess 271 is defined by a seat 272, a first wall 274, a second wall (not shown) and a third wall 276 interconnecting first wall 274 and the second wall. Apertures 228 extend through third wall 276.

Third leg 210 includes a first aperture 280 and a second aperture 282 extending therethrough for receipt of second terminals 92a and 92a', respectively. Mounting flange 204 includes a first aperture 284 and a second aperture 286 extending therethrough for receipt of first terminals 90a and 90a', respectively. As previously described in relation to one-piece housing 12, one-piece housing 202 may also be constructed by die casting, a powered metal sintering or any number of other metal forming processes. Furthermore, it is contemplated that each of the surfaces of one-piece housing 202 may be initially formed as "net-shaped" surfaces not requiring subsequent machining operations. First heater module 20 and second heater module 20' include surfaces contacting the "net-shaped," "as-cast" or "as-formed" surfaces.

In similar fashion to the assembly process described in relation to air heater 10, first heater module 20 is sub-assembled and a compressive force is added to displace first holder 24 toward second holder 26. First heater module 20 is positioned within window 214 until the first and second holders engage seats 242 and 264. At this time, end faces 41 and 141 are positioned adjacent to retaining walls 220 and 226, respectively.

Second heater module 20' is coupled to one-piece housing 202 in a similar manner. Once second heater module 20' is properly positioned within window 214, end faces 41' and 141' are positioned within apertures 228 and 218 and adjacent to retaining walls 230 and 222, respectively. Therefore, both first heater module 20 and second heater module 20' are coupled to one-piece housing 202 such that relative movement between the heater modules and the housing is restricted.

The heater embodiment depicted in FIGS. 4-6 is configured for use in a 24 volt system where heating elements 28 and 28' are electrically connected to one another in series. Alternatively, it should be appreciated that heater elements 28 and 28' may be electrically coupled to one another in parallel if air heater 200 is to be powered by a 12 volt supply. The electrical pathway may be adjusted by modifying the position and material of a number of washers 290. Specifically, some of the washers are constructed from electrically insulating material while other washers are constructed from electrically conducting materials.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A heating device for use in an internal combustion engine having an intake defining a passage, the intake including an opening in communication with the passage, the heating device comprising:
a one-piece housing having a mounting flange portion, a first leg portion positioned substantially parallel to and spaced apart from a second leg portion, the mounting flange portion being adapted to mount to the intake and cover the opening; and
first and second heating elements coupled to the one-piece housing and positioned between the first and second leg portions, the heating elements being positioned in heat transfer relation with the passage to thereby heat air flowing through the passage, wherein the one piece housing further includes a rib radially extending from the first leg portion to separate the first heating element from the second heating element, the rib restricting axial translation of the first and second heating elements toward one another.

2. The heating device of claim 1 wherein the first and second leg portions extend substantially perpendicularly from the mounting flange portion.

3. The heating device of claim 2 wherein the mounting flange portion is substantially planar.

4. The heating device of claim 3 wherein the mounting flange portion is substantially contiguous and impervious to the passage of air.

5. The heating device of claim 1 wherein the one-piece housing includes a third leg portion interconnecting ends of the first and second leg portions, the mounting flange portion interconnecting opposite ends of the first and second leg portions.

6. The heating device of claim 5 wherein the first, second, and third leg portions along with the mounting flange portion form an uninterrupted, contiguous structure surrounding a window.

7. The heating device of claim 6 wherein the heating elements are positioned within the window.

8. The heating device of claim 1 wherein at least one heating element includes a flat ribbon shaped to include a plurality of substantially 180 degrees bends such that a plurality of ribbon portions are positioned substantially parallel to and spaced apart from one another.

9. The heating device of claim 1 wherein the one-piece housing includes net-shaped surfaces that have not been machined, at least one of the net-shaped surfaces being in contact with a member supporting one the heating elements.

10. The heating device of claim 1 wherein the first and second leg portions include recesses in receipt of holders coupled to the heating elements, the holders being in biased engagement with the recesses to couple the heating elements to the one-piece housing, each of the recesses being at least partially defined by the rib.

11. The heating device of claim 10 wherein one of the holders includes a tab protruding therefrom, the tab being positioned within an aperture formed in the first leg portion to restrict movement of the holder relative to the one-piece housing in a direction away from the rib.

12. The heating device of claim 1 wherein the one-piece housing includes another rib radially inwardly extending from the second leg portion, the rib and the another rib being substantially co-planar with one another.

13. The heating device of claim 5 wherein the third leg portion includes another recess in receipt of one end of the first heating element.

14. A heating device for use in an internal combustion engine having an intake defining a passage, the intake including an opening in communication with the passage, the heating device comprising:
a one-piece housing having a mounting flange portion and a frame portion extending substantially perpendicular to the mounting flange portion, the frame portion circumscribing a window extending through the housing and including a radially inwardly extending rib, the rib including a first surface and a second opposite surface, the mounting flange portion being adapted to mount to the intake and cover the opening; and first and second heating elements coupled to the one-piece housing and positioned within the window in heat transfer relation with the passage to heat air flowing through the passage, the first heating element being restricted from movement by the first surface, the second heating element being restricted from movement by the second surface.

15. The heating device of claim 14 wherein the frame portion includes first and second leg portions extending substantially perpendicularly from the mounting flange portion.

16. The heating device of claim 15 wherein the one-piece housing includes a third leg portion interconnecting ends of the first and second leg portions, the mounting flange portion interconnecting opposite ends of the first and second leg portions.

17. The heating device of claim 16 wherein one of the heating elements includes a flat ribbon shaped to include a plurality of substantially 180 degree bends such that a plurality of ribbon portions are positioned substantially parallel to and spaced apart from one another.

18. The heating device of claim 17 wherein the frame portions include recesses in receipt of holders coupled to the heating elements, the holders being in biased engagement with the recesses to couple the heating elements to the one-piece housing.

19. The heating device of claim 18 wherein one of the holders engages at least two of the 180 degree bends to support the heating elements within the window.

20. The heating device of claim 19 wherein one of the holders includes a tab protruding therefrom, the tab being positioned within an aperture formed in the frame portion to restrict movement of the holder relative to the one-piece housing.

21. The heating device of claim 20 wherein the one-piece housing includes net-shaped surfaces that have not been machined, at least one of the net-shaped surfaces being in contact with one of the holders supporting one of the heating elements.

22. The heating device of claim 14 wherein the frame portion includes another radially inwardly extending rib positioned on an opposite side of the window as the rib.

23. The heating device of claim 22 wherein the another rib extends substantially co-planar with the rib.

24. A heating device for use in an internal combustion engine having an intake defining a passage, the intake including an opening in communication with the passage, the heating device comprising:

a first heating element;

first and second holders supporting the first heating element; and a one-piece die cast housing having a tubular portion circumferentially encompassing the first holder, the second holder and the heating element, the holders being biasedly engaged with an inner wall of the tubular portion, the die cast housing including a plate portion integrally formed with the tubular portion, the plate portion including a substantially planar surface adapted to engage the intake and cover the opening, the tubular portion and the first heating element being adapted to fit within the opening and be positioned within a heat transfer relationship with air within the passage, the inner wall defining a first recess in receipt of the first holder, a second in receipt of the second holder and a third recess in receipt of an end of the first heating element, wherein the third recess is at least partially defined by a surface offset from end of the first and second recesses.

25. The heating device of claim 24 wherein the plate portion radially extends beyond the tubular portion.

26. The heating device of claim 25 wherein a longitudinal axis extending through the tubular portion is positioned substantially parallel to the planar surface.

27. The heating device of claim 26 wherein an electrical terminal extends through the plate portion.

28. The heating device of claim 27 further including a second heating element separate and spaced apart from the first heating element, the second heating element being supported by additional separate holders, the separate holders being in biased engagement with the inner wall of the tubular portion.

* * * * *